(12) United States Patent
DiChiara et al.

(10) Patent No.: US 10,394,047 B2
(45) Date of Patent: Aug. 27, 2019

(54) SPLITTER CONFIGURATION FOR GLASSES

(71) Applicant: LIBERTY SPORT, INC., Fairfield, NJ (US)

(72) Inventors: Carmine S. DiChiara, Warren, NJ (US); Deni Crescenzi, Toronto (CA)

(73) Assignee: Liberty Sport, Inc., Fairfield, NJ (US)

( * ) Notice: Subject to any disclaimer, the term of this patent is extended or adjusted under 35 U.S.C. 154(b) by 0 days.

(21) Appl. No.: 15/705,744

(22) Filed: Sep. 15, 2017

(65) Prior Publication Data

US 2018/0011338 A1 Jan. 11, 2018

Related U.S. Application Data

(63) Continuation of application No. 14/513,930, filed on Oct. 14, 2014, now Pat. No. 9,791,714.

(51) Int. Cl.
*G02C 1/08* (2006.01)
*G02C 5/12* (2006.01)
*G02C 5/00* (2006.01)

(52) U.S. Cl.
CPC .............. *G02C 1/08* (2013.01); *G02C 5/126* (2013.01); *G02C 5/008* (2013.01); *G02C 2200/08* (2013.01)

(58) Field of Classification Search
CPC ...... G02C 2200/08; G02C 1/08; G02C 5/126; G02C 2200/18

USPC .................. 351/90–101, 136, 140, 149, 154
See application file for complete search history.

(56) References Cited

U.S. PATENT DOCUMENTS

| 3,060,803 | A | 10/1962 | McCulloch et al. |
| 5,805,257 | A | 9/1998 | Hagler |
| 7,585,072 | B1 | 9/2009 | Tzu-Feng |
| 8,550,620 | B2 | 10/2013 | Altemare et al. |
| 9,791,714 | B2 * | 10/2017 | DiChiara ................. G02C 1/08 |
| 2010/0085533 | A1 | 4/2010 | Calilung et al. |
| 2011/0194071 | A1 | 8/2011 | Cronin et al. |

FOREIGN PATENT DOCUMENTS

DE 102011089001 A1 6/2013

* cited by examiner

*Primary Examiner* — Hung X Dang
(74) *Attorney, Agent, or Firm* — Botos Churchill IP Law LLP

(57) ABSTRACT

An eyewear frame assembly includes a frame having a rim for securing a lens. The frame further has a first segment and a second segment. At least one of the first segment and the second segment is movable relative to the other of the first segment and the second segment so as to allow insertion within or removal of the lens from the rim. The frame assembly also includes a projection that extends circumferentially from the first segment. The projection and the second segment are configured to be releasably secured to another, thereby securing the lens within the rim.

20 Claims, 8 Drawing Sheets

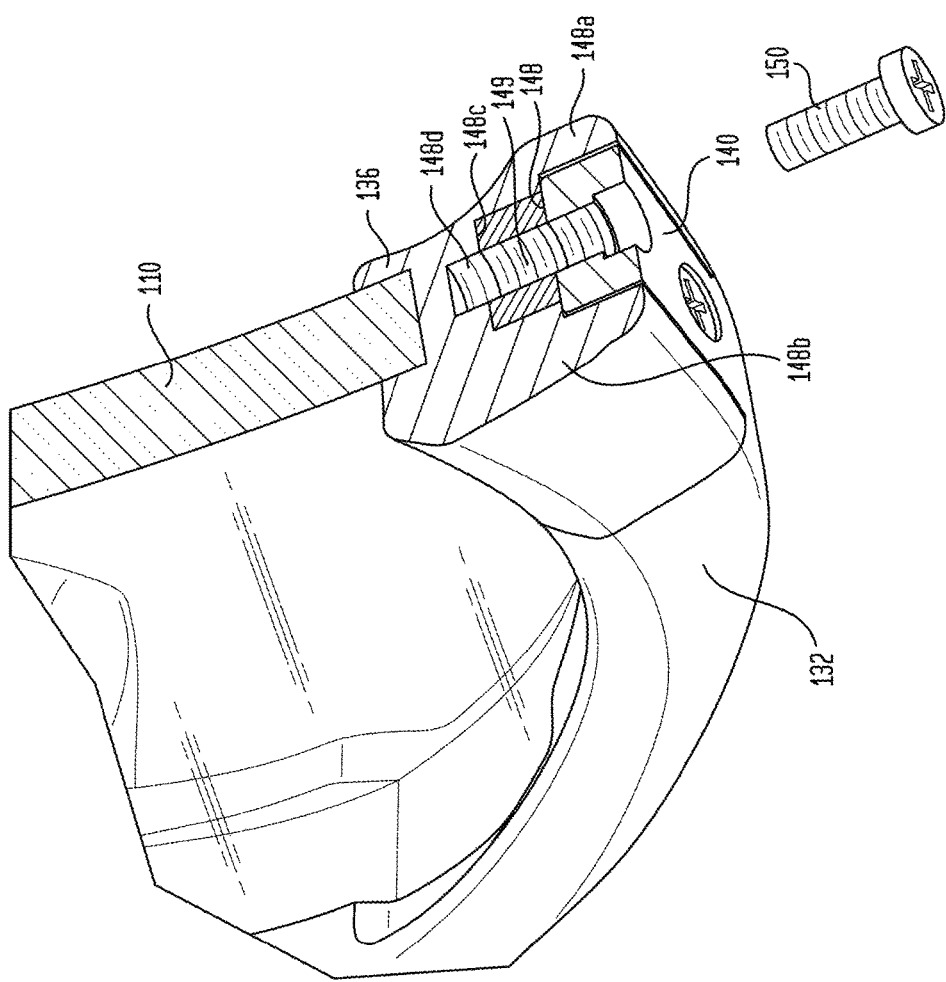

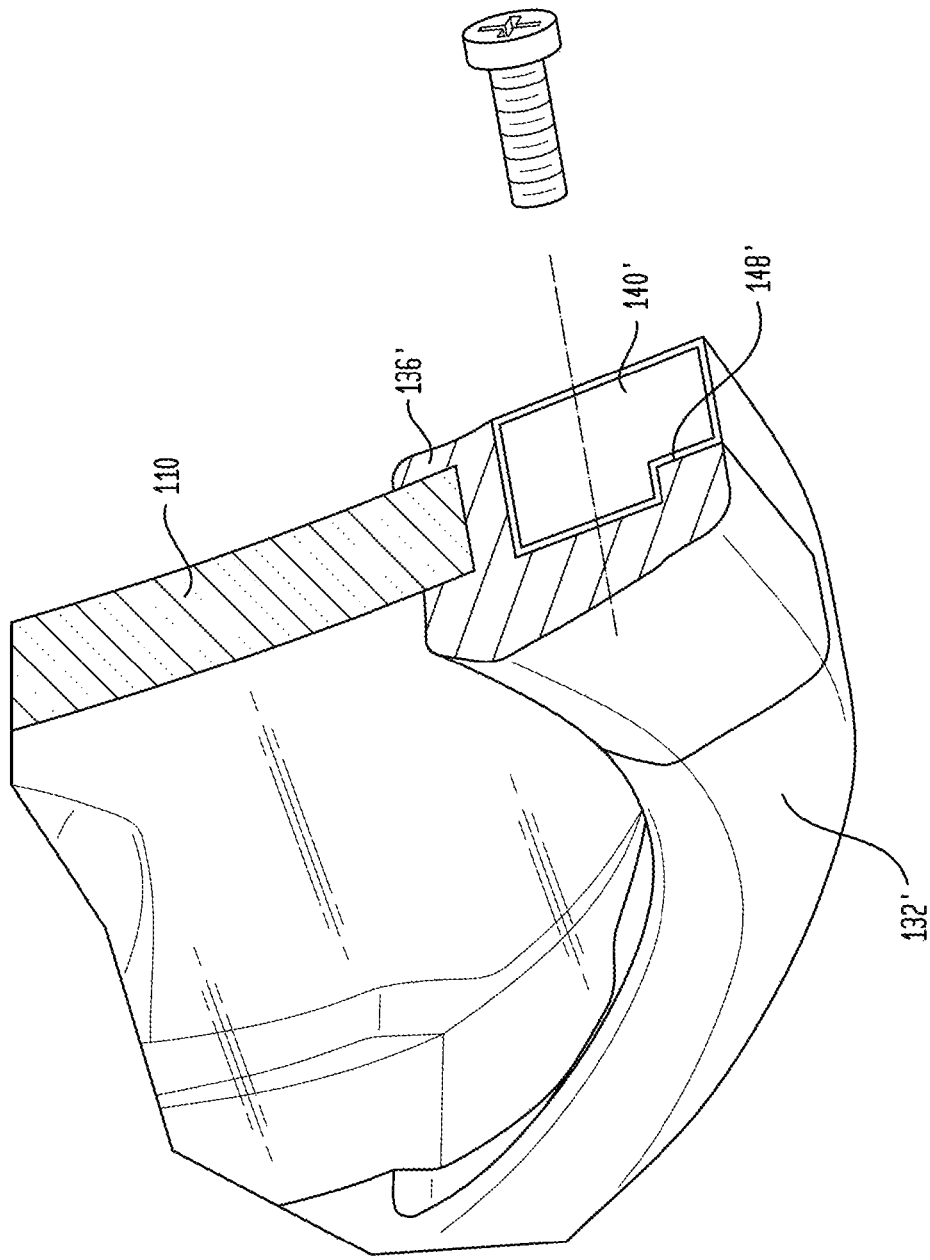

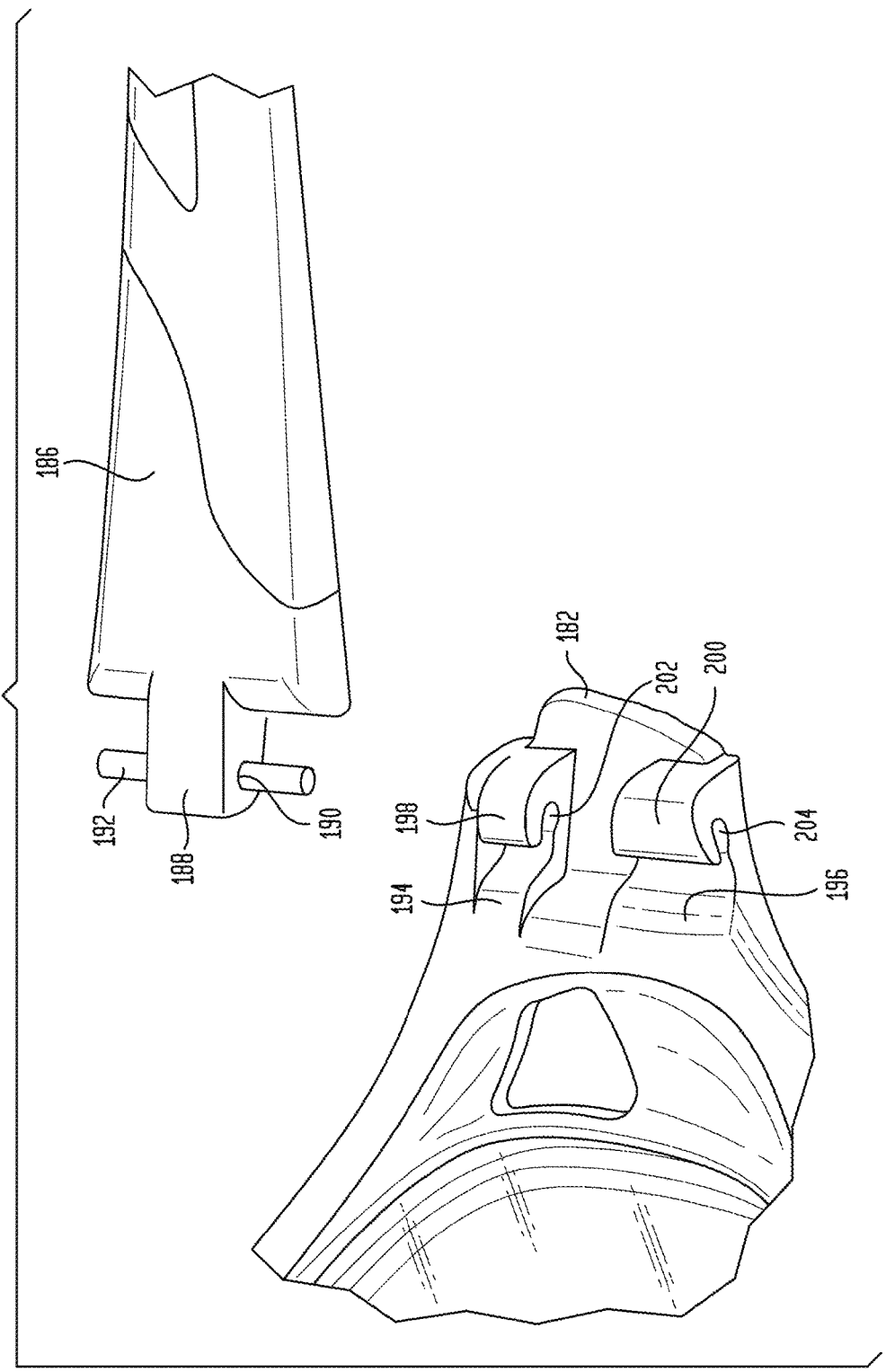

SPLITTER CONFIGURATION FOR GLASSES

CROSS-REFERENCE TO RELATED APPLICATIONS

This application is a continuation of U.S. application Ser. No. 14/513,930, filed on Oct. 14, 2014, the disclosure of which is incorporated herein by reference.

TECHNICAL FIELD

The present invention relates to an eyewear frame assembly that is impact resistant and, more particularly, to an eye-wear frame assembly that has a securable opening for easily inserting and removing a lens.

BACKGROUND OF THE INVENTION

Eyewear frame assemblies often need to be impact, resistant, such as when worn for sporting activities. Likewise, retention of lenses within the frame assemblies under impact may be highly desirable. For example, ASTM F803 is a stringent standard governing impact resistance requirements for eyewear worn during sporting activities. Thermoplastic materials, for example polycarbonate, may be materials of choice for eyewear frames meeting the ASTM F803 requirements used for non Rx-able frames known as Plano frames. For prescription eyewear, there may be a need, for a way to insert the lenses and still maintain the impact, strength of the material. However, most existing eyewear frames do not provide the impact, resistance or the lens retention required by ASTM F803. Wearing such eyewear frames during a sporting activity could result in serious injury to wearers if the frames and/or the lenses are not able to sustain impacts. Some other materials may require an excessively thick eyewear frame to meet the impact resistance requirements, so that the resulting eyewear frames are aesthetically undesirable, bulky and awkward for wearers.

A need may exist for eyewear frames that allow for insertion of lenses without affecting the impact, resistance of the eyewear frames and still provide aesthetically pleasing and efficient eyewear frames.

BRIEF SUMMARY OF THE INVENTION

According to an embodiment of the disclosure, an eyewear frame assembly comprises a frame having a rim for securing a lens. The rim has a first segment and a second segment. At least one of the first segment and the second segment is movable relative to the other of the first segment and the second segment so to allow insertion within or removal of the lens from the rim. A projection extends circumferentially from the first segment. The projection and the second segment are configured to be releasably secured to one another, wherein the lens is secured by the rim when the projection is secured to the second segment.

According to an embodiment of the disclosure, an eyewear frame assembly comprises a frame having a first rim for securing at least a first lens and a second rim for securing at least a second lens. The first rim has a first segment and a second segment. At least one of the first segment and the second segment is movable relative to the other of the first segment and the second segment so as to allow insertion within or removal of the first lens from the first rim. Likewise, the second rim has a third segment and a fourth segment. At least, one of the third segment and the fourth segment is movable relative to the other of the third segment and the fourth segment so as to allow insertion within or removal of the second lens from the second rim. A first projection extends circumferentially from the first segment and a second projection extends circumferentially from the third segment. The first and second projections are configured to be releasably secured to the second segment and the fourth segment, respectively. The first lens is secured by the first rim when the first projection is secured to the second segment and the second lens is secured by the second rim when the second projection is secured to the fourth segment.

BRIEF DESCRIPTION OF THE DRAWINGS

FIG. 6A illustrates a cross-sectional view of the eyewear frame assembly along line 6A-6A of FIG. 2 according to an embodiment of the disclosure.

FIG. 6B illustrates a cross-sectional view of the eyewear assembly along line 6A-6A of FIG. 2, according to another embodiment of the invention.

FIG. 7 illustrates an enlarged view of a temple arm and portion of a frame of the eyewear frame assembly of FIG. 1 according to aspects of the disclosure.

DETAILED DESCRIPTION

Figure 1:
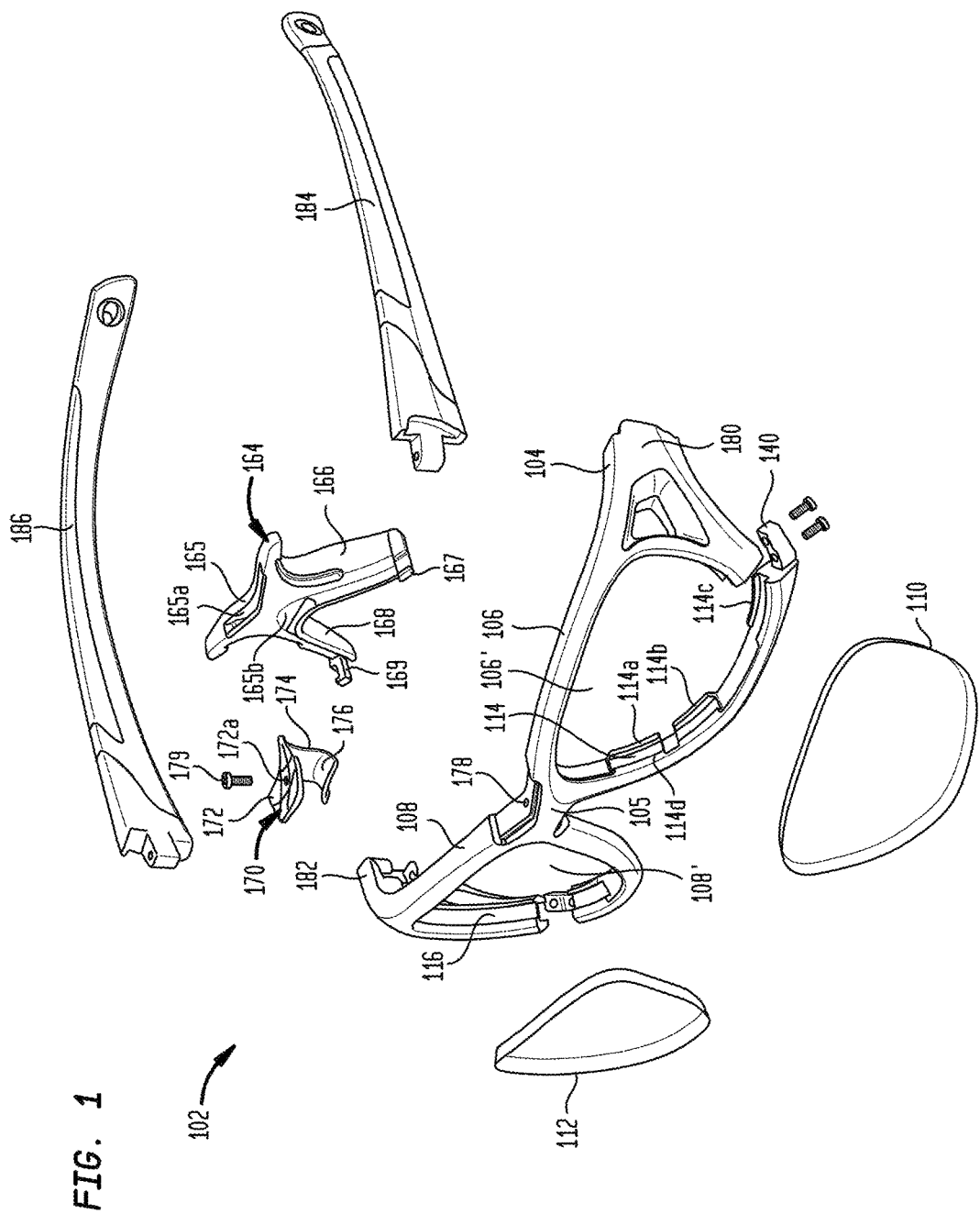
FIG. 1 illustrates an exploded, perspective view of an exemplary eyewear frame assembly according to aspects of the disclosure.

FIG. 1 illustrates an exploded, perspective view of the disclosed eyewear frame assembly 102 according to aspects of the disclosure. The eyewear frame assembly 102 includes a frame 104 that has a first rim 106 and a second rim 108 connected about a nose-bridge 105. The rims 106 and 108 surround first and second openings 106' and 108', respectively, which openings may be circular, elliptical, or of any other shape depending on the shapes of the rims. The first rim 106 may hold a first lens 110 across the opening 106' and the second rim 108 may hold a second lens 112 across the opening 108'. The first lens 110 and the second lens 112 may be of similar shape as the first opening 106' and the second opening 108', respectively. While the eyewear frame assembly 102 is described as having first and second rims 106 and 108, the present disclosure is also applicable to an eyewear frame assembly having a single rim for receiving a single lens. On the other hand, another embodiment of the disclosure may include multiple lenses, for example, two or more lenses retained within each of the first and second rims 106 and 108, without departing from the scope of the invention. For instance, in one embodiment, each of the first and second rims 106 and 108 may hold a first lens and a second lens, in a parallel configuration, i.e., a first lens in the front and a second lens in the rear relative to the first lens.

The frame 104 may include one or more structures for securing the lenses 110 and 112. For example, the first rim 106 may include a first groove 114 defined thereon, and the second rim 108 may include a second groove 116 defined thereon. The first groove 114 and the second groove 116 may extend circumferentially about an inside surface of the rims 106 and 108, respectively. The widths of the first groove 114 and the second groove 116 may be such that the first lens 110 fits snugly within the first groove 114 and the second lens 112 fits snugly within the second groove 116.

Figure 2:
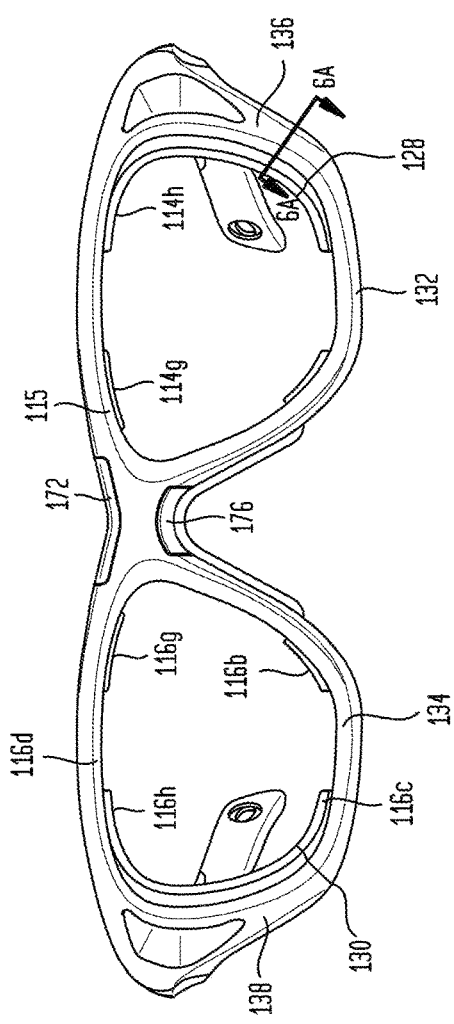
FIG. 2 illustrates a front view of the eyewear frame assembly of FIG. 1 according to aspects of the disclosure.
Figure 3:
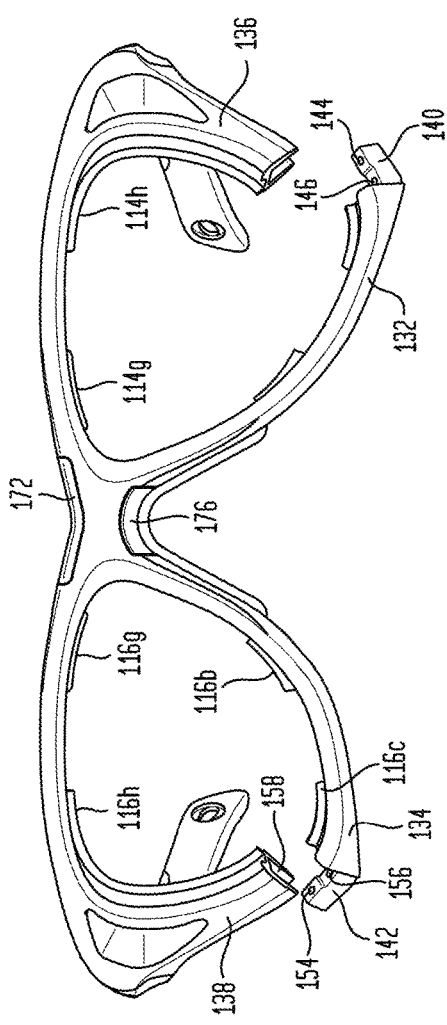
FIG. 3 illustrates a front view of the eyewear frame assembly of FIG. 1 with opened openings according to an embodiment of the disclosure.
Figure 4:
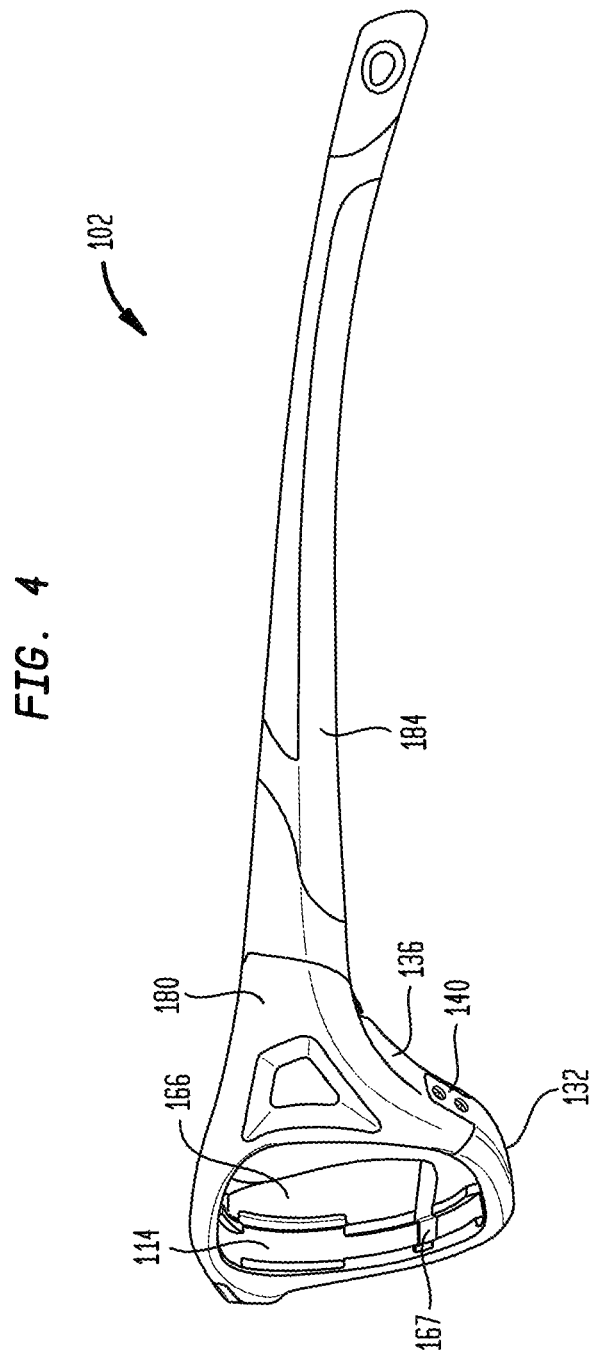
FIG. 4 illustrates a side view of the eyewear frame assembly of FIG. 1 according to an embodiment of the disclosure.

The frame 104 may further include one or more retaining mechanisms for retaining the lenses 110 and 112 within the first 114 and second grooves 116, respectively. In one embodiment, the first rim 106 may include one or more rear retaining walls 114a-114c and a front retaining wall 114d. In the illustrated embodiment, the rear retaining walls 114a, 114b, and 114c may be paired with one corresponding front, retaining wall 114d so as to form individual channels within the first groove 114. FIG. 1 illustrates that the bottom portion of the first, rim 106 may include one or more of these channels, where the first channel includes the rear retaining walls 114a, 114b and the front retaining wall 114d, and the second channel includes the rear retaining wall 114c and the front retaining wall 114d. FIGS. 2-3 illustrate that the top portion of the first rim 106 may include also include channels. For example, FIGS. 2-3 illustrate that the channels in the top portion of the first rim 106 may include a first channel formed from a rear retaining wall 114g with a corresponding front retaining wall 115 and a second channel formed from a rear retaining wall 114h with the corresponding front retaining wall 115. It will further be understood that, in an embodiment with, for example, two lenses within a rim, two corresponding sets of channels may be defined to secure the lenses therewitnin. For instance, if two lenses are to be held in one behind the other, two channels may be defined one behind the other along the inner surface of the first rim 106.

In another embodiment, the first rim 106 may include a continuous rear retaining wall and a continuous front retaining wall. In yet other embodiment, one of the front retaining wall and the rear retaining wall may be continuous while the other may be segmented.

The second rim 108 may also include one or more retaining mechanisms for securing and retaining the lens 112 within the second rim 108. As shown in FIGS. 2-3, the second rim 108 may include rear retaining walls or wall segments 116b, 116c, 116g, 116h and a corresponding front retaining wall 116d. Each of the rear retaining walls or wall segments 116b, 116c, 116g, 116h for the second rim 108 may be paired with a corresponding front retaining wall 116d so as to form individual channels along an inner periphery (e.g., along the second groove) of the second rim 108. One or more of the channels of the second rim 108 may be formed along a bottom portion of the second rim 108 and one or more of the channels of the second rim 108 may be formed along a top portion of the second rim 108 (e.g., the channels formed by front retaining wall 116d and rear retaining walls 116g and 116h). In another embodiment, the second rim 108 may include a continuous rear retaining wall and a continuous front retaining wall. In yet other embodiment, one of the front retaining wall and the rear retaining wall may be continuous while the other may be segmented.

The structure of the first and second rims 106 and 108 may be such that they permit insertion and firm retention of the first and second lenses 110 and 112, respectively, therewithin. In particular, a first split 128 may be formed in the first rim 106 and a second split 130 may be formed in the second rim 108, as seen in FIGS. 1-3. In an exemplary embodiment, the splits 128, 130 are illustrated proximal to the temporal ends of the frame 104. It will be understood that in other embodiments, the splits may be defined at a different location. Still further, each of the rims 106, 108 may have a split defined thereon at a different location relative to one another. The first split 128 may allow a flexible first segment 132 of the first rim 106 to separate from the frame 104 and the second split 130 may allow a flexible first segment 134 of the second rim 108 to separate from the frame 104. The flexible movement of the flexible first segments 132, 134 from the frame 104 allows an individual, for example, an eye-care professional, to quickly insert or remove the first lens 110 from the first rim 106 and the second lens 112 from the second rim 108, respectively, while ensuring proper retention of the first and second lenses 110, 112 once installed within the respective rims 106, 108.

To secure the flexible first segment 132 to the frame 104, the flexible first segment 132 includes a projection 140 that circumferentially extends from the flexible first segment. A cross-section of the exemplary projection 140 fitted into the upper portion 136 of the frame 104 is shown in FIG. 6A. Another cross-section of an exemplary projection 140' fitted into the upper portion 136' of a frame 104' is shown in FIG. 6B.

As illustrated in FIG. 6A, the projection 140 includes one or more holes, such as holes 144 and 146, for receiving one or more fasteners to secure the flexible first segment 132 to a second segment 136 of the first rim 106. The second segment 136 of the first rim 106 includes, at its end facing the first segment 132, a recess 148 shaped to receive the projection 140. The recess 148 is defined by two lateral sidewalls 148a, 148b and a rear wall (not shown) extending from a floor 148c of the frame 104, and is configured to accommodate the projection 140 therewithin. In the embodiment illustrated in FIG. 6A, the recess 148 opens downward when the frame 102 is worn by a user. In the embodiment illustrated in FIG. 6B, on the other hand, a recess 148' opens toward, the user when the frame 102 is worn by the user. It will be understood that the recess may open in other ways with the projection configured correspondingly, without departing from the scope of the disclosure. Still further, while the illustrated embodiments illustrate a recess in the first segment 132, in other embodiments, the first segment 132 and the second segment 136 may be shaped complementarily to align with one another and be secured to one another, for example, by having a projection on each of the first and second segments 132, 136 extending in the direction of the other of the first and second segments 132, 136.

Referring back to FIG. 6A, as with the projection 140, the floor 148c of the recess 148 may also include one or more holes, for example, hole 148d for receiving the fasteners used to secure the projection 140 to the second segment 136 of the frame 104. In one embodiment, the holes 144, 146, and 148 may be threaded internally, and the fasteners may be screws, such as screws 150 and 152, and may be threadedly insertable into the holes 144 and 146 and into the holes of the floor 148c. In other embodiments, the holes 144 and 146 may not be threaded and instead may be configured to receive a non-threaded fastener, for example, a pin or an insert. In yet another embodiment, while the hole 148d may not be threaded internally, the fastener such a screw may create the threads on an interior surface of the hole 148d, when the fastener is inserted thereinto.

In yet another embodiment, the insert may be threaded to receive a threaded fastener and may take the form of a metal insert or a polymer insert. In another embodiment, the projection 140 may include a protrusion configured to be received by a hole in the recess. Thus, for example, a male protrusion may designed on one of the first and second segments 132, 136 and may be received into a corresponding female receiving end, e.g., a socket, formed on the other of the first and second segments 132, 136.

Still further, mechanisms such as barbed pins, sliders, C-clips, cam locks, and latches may be employed to releasably secure suitably configured first and second segments 132, 136 to one another. It will thus be understood that many different configurations may be employed to releasably secure the first and second segments 132, 136 to one another, without departing from the scope of the disclosure.

In an exemplary embodiment, a secondary receiving piece 149, for example, in the form of a metal or a polymer plate, may be disposed between floor 148c and the projection 140. The secondary receiving piece 149 is configured to receive the fasteners, for example, screws 150 and 152. An advantage of the secondary receiving piece 149 is that the secondary receiving piece 149 may provide structural integrity to the interface of second segment 136 and the projection 140.

To secure the flexible first segment 134 of the second rim 108 to a second segment 138, the flexible first segment includes a projection 142 that circumferentially extends from the flexible first segment. The projection 142 includes one or more holes, such as holes 154 and 156, for receiving one or more fasteners to secure the flexible first segment 134 to the second portion 138 of the second rim 108. The second segment 138 of the second rim 108 includes a recess 158 shaped to receive the projection 142. The recess 158 includes two lateral sidewalls (not shown, but similar to sidewalls 148a, 148b) and a rear wall (not shown) extending from a floor (not shown, but similar to the floor 148c) of an inside surface of the frame 104 is configured for accommodating the projection 142 into the recess 158. As with the projection 142, the floor of the recess 158 may also include one or more holes (not shown) for receiving the fasteners used to secure the projection 142 to the second segment 138 of the frame 104. In one embodiment, the holes 154 and 156 may be internally threaded, and the fasteners may be screws, (not shown), and may be threadedly insertable into the holes 154 and 156 and into the holes (not shown) of the floor of the recess 158.

Figure 5:
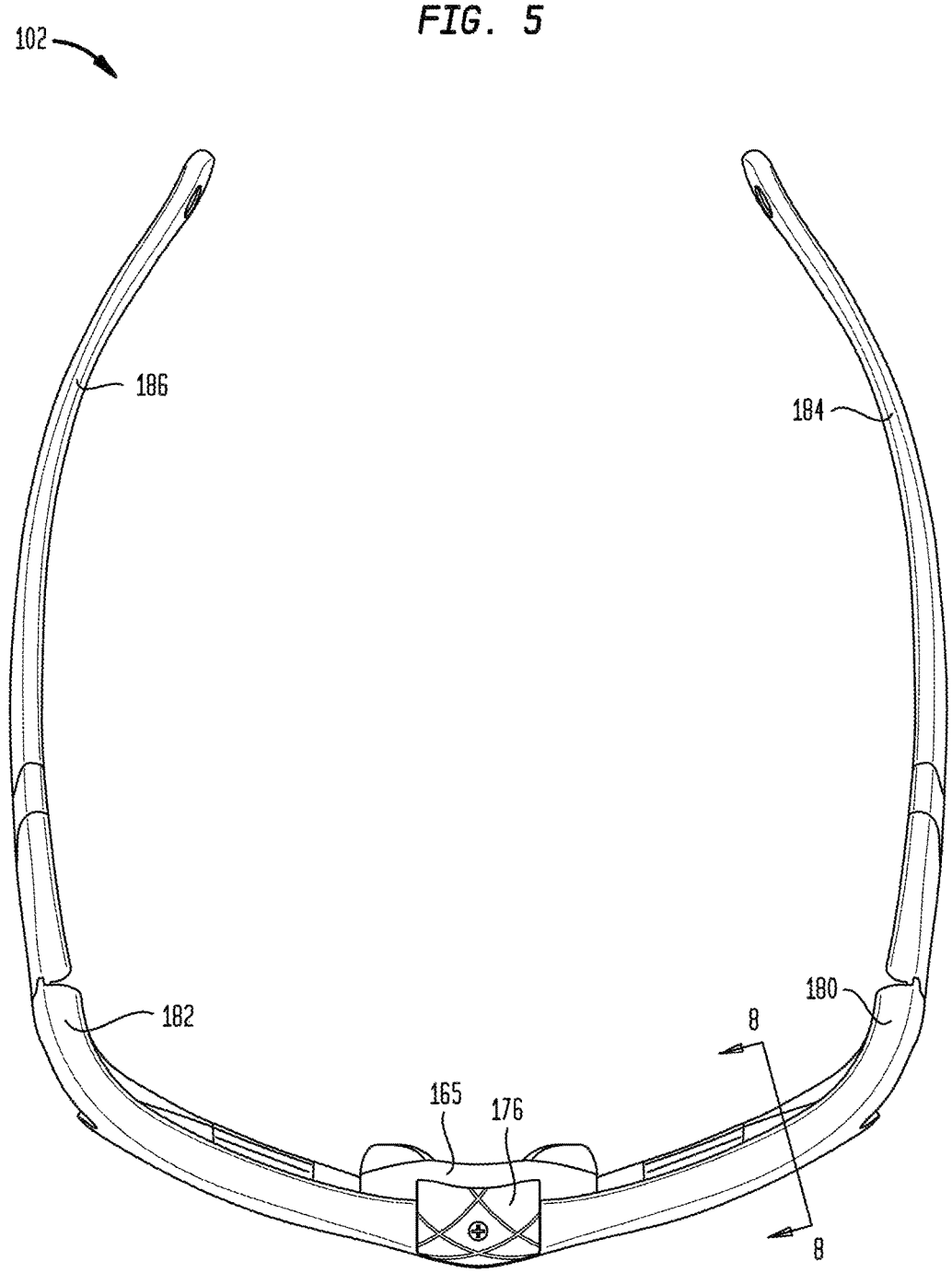
FIG. 5 illustrates a top view of the eyewear frame assembly of FIG. 1 according to an embodiment of the disclosure.
Figure 8:
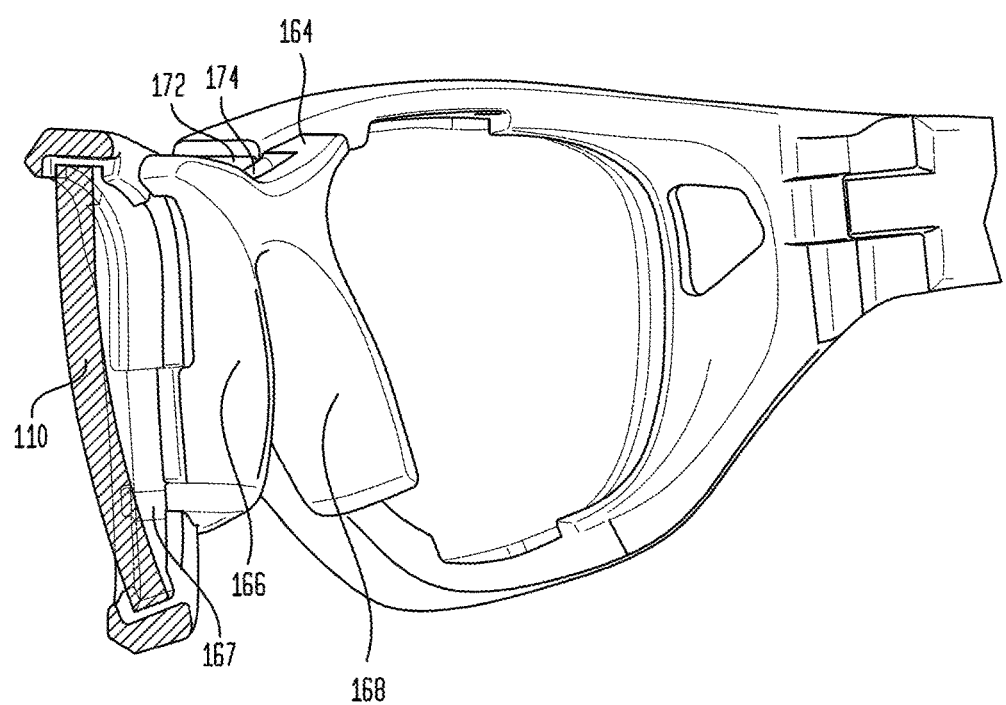
FIG. 8 illustrates a cross-sectional view of the frame of the eyewear frame assembly along line 8-8 of FIG. 5 according to aspects an embodiment of the disclosure.

For the comfort of the wearer, the eyewear frame assembly 102 further includes a nose-pad 164. FIGS. 1, 5, and 8 illustrate various views of the eyewear frame assembly 102 where the nose-pad 164 can be seen. In an exemplary embodiment, the nose-pad 164 may be removable from the frame assembly 102. In another embodiment, the nose-pad 164 may be secured to the frame assembly, for example, with an adhesive or other suitable material. The nose-pad 164 includes first pad 166 and second pad 168 extending from a bridge 165. The bridge 165 is configured to be secured to the bridge 105 of the frame 104. The nose-pad 164 further includes one or more projections, such as tabs 167 and 169, extending from the first and second nose-pads 166, 168, respectively. The bridge 165 includes a through-recess having a generally vertical opening 165a and a generally lateral opening 165b. As the eyewear frame assembly 102 is expected to be used during physically intense activities, the nose-pad 164 may be further secured to the frame 104 using a securing member 170. In an exemplary embodiment, the securing member 170 has a C-profile having a top wall 172, an intermediate wall 174, and a bottom wall 176. In one configuration, the intermediate wall 174 is configured to be inserted into the through-opening of the nose-pad 164 and the top wall 172 and the bottom wall 176 are configured to establish a snap fit about bridge 105. A hole 172a in the top wall 172 of the securing member 170 and a hole 178 in a top surface of the bridge 105 may be aligned to receive a fastener 179 that secures the securing member 170 to the frame 104. In an exemplary configuration, the holes 172 and 178 may be internally threaded and the fastener 174 may be a screw that is threadedly insertable into the holes 172 and 178.

Thus, the nose-pad body 164 may be secured to the frame 104 when the securing member 170 is coupled to the removable nose-pad 164 via the through-recess, the tabs 167 and 169 may be inserted into a first gap between the retaining walls 114a, 114b and against the on the first rim 106 and into a second gap between the retaining walls 116a, 116b on the second rim 108, respectively. Once the tabs 167, 169 are so disposed, the first lens 110 and the second lens 112 may be fitted into the first rim 106 and the second rim 108, respectively. Thus, the nose-pad 164 is secured to the bridge 105 by the securing member 170, on one hand, and the nose-pads 166 and 168 are further secured to the frame 140, via the tabs 167, 169 between the first and the second rims 106, 108 and the first and second lenses 110, 112, respectively.

The frame assembly 102 also includes a first temple arm 184 and a second temple arm 186 for securing the frame assembly 102 to the wearer of the assembly 102. In one embodiment, the first temple arm 184 may be pivotally connected to the projection 180 of the second segment 136 of the frame 104.

FIG. 7 illustrates an enlarged view of the temple arm 186 and the projection 182 of the frame 104 to which the temple arm 186 may pivotally connect. In one embodiment, the temple arm 186 includes a projection 188 extending laterally therefrom, and the projection 188 may include a through-hole 190 that extends therethrough. The through-hole 190 may receive a securing member 192, such as a vertically disposed crossbar, on which the temple arm 186 rotationally pivots. The projection 182 of the frame 104 includes an upper receiving surface 194 and a lower receiving surface 196 configured to receive the securing member 192 of the temple arm 186. In particular, the upper receiving surface 194 includes a curved wall 198, where the curved wall 198 forms an recess hole 202 in which the securing member 192 may be inserted. Similarly, the lower receiving surface 196 includes a curved wall 200, where the curved wall 200 forms a lower recess 204 into which the securing member 192 may also be inserted.

The second temple arm 184 may be pivotally rotatable on the portion 180 similar to the first temple arm 186. In that regard, the second temple arm 184 may also include a projection (not shown, but similar to projection 188) with a through-hole (not shown, but similar to through-hole 190) that, extends through the projection. A securing member (not shown) may be insert able into the hole (not shown) such that, the second temple arm 184 is then secured to, and pivotally rotatable on, the portion 180 of the frame 104.

The frame 104 and temple arms 184-186 may be made of plastic. For example, the frame 104 and temple arms 184-186 may be made of a suitable material such a synthetic polymer and a polyamide or other similar strength material. In an exemplary embodiment, the material may be nylon.

An advantage of the frames described herein is that the frames provide increased impact resistance, for example, against a projectile such as a sport ball. Still further, the described frames provide a simplified way for inserting lenses as well as a desired impact resistance, without being overly bulky.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An impact resistant eyewear frame assembly for sporting activities, comprising:
    a frame having a rim for securing a lens, said rim having a first segment that is flexible and a second segment, the first segment and second segment being integral portions of the rim, wherein at least one of said first segment and second segment is movable relative to the other of the first segment and the second segment so as to allow insertion within or removal of said lens from said rim;
    a projection extending toward a temporal end of the rim circumferentially from, and integral with, said first segment, the projection having an outer rim surface continuing from an outer rim surface of the first segment when secured, the outer rim surface of the projection comprising a plurality of holes;
    wherein said projection and said second segment are configured to be releasably secured to one another, wherein said lens is secured by said rim when said projection is secured to said second segment near a temporal end of the frame,
    a nose-pad body comprising first and second pads, the nose-pad body configured to be secured to a bridge of said frame by a nose-pad securing member comprising a top wall and a bottom wall,
    wherein the nose-pad body is secured about a bridge of the frame at a top surface of the bridge of the frame and a bottom surface of the bridge of the frame with attachment of: (a) the top wall of the nose-pad securing member at the top surface of the bridge of the frame and (b) the bottom wall of the nose-pad securing member at the bottom surface of the bridge of the frame,
    wherein the frame provides impact resistance against a sport projectile.

2. The impact resistant frame assembly of claim 1, wherein said projection has at least one threaded passageway for receiving a fastener, and
    wherein said second segment has a downward recess defined therewithin for receiving said projection.

3. The impact resistant frame assembly of claim 2, further comprising a fastener threadedly insertable into said threaded passageway, wherein said lens is secured by said rim when said fastener is threadedly inserted into said projection.

4. The impact resistant frame assembly of claim 3, further comprising a secondary receiving element disposed between said projection and said second segment for receiving the fastener.

5. The impact resistant frame assembly according to claim 2, wherein said projection extends along an outer surface of the first segment.

6. The impact resistant frame assembly of claim 1, wherein said first segment includes a groove along an inner surface into which groove said lens is insertable.

7. The impact resistant frame assembly according to claim 1, wherein said frame is made of a plastic.

8. The impact resistant frame assembly according to claim 7, wherein said plastic is nylon.

9. The impact resistant frame assembly according to claim 1, wherein the nose-pad securing member comprises a C-profile and is connected to the nose-pad body by a through-recess of the nose-pad body.

10. The impact resistant frame assembly according to claim 9, wherein the bridge comprises a hole for securing the nose-pad securing member to the bridge.

11. The impact resistant frame assembly according to claim 1, wherein the nose-pad body is adhered to the frame.

12. An impact resistant eyewear frame assembly for sporting activities, comprising:
    a frame having:
        a first rim for securing at least one first lens, said first rim having a first segment that is flexible and a second segment, the first segment and second segment being integral portions of the first rim, wherein at least one of said first segment and the second segment is movable relative to the other of the first segment and the second segment so as to allow insertion within or removal of said first lens from said first rim; and
        a second rim for securing at least one second lens, said second rim having a third segment that is flexible and a fourth segment, the third segment and fourth segment being integral portions of the second rim, wherein at least one of said third segment and the fourth segment is movable relative to the other of the third and the fourth segment so as to allow insertion within or removal of said second lens from said second rim;
    a first projection extending toward a first temporal end of the first rim circumferentially from, and integral with, said first segment, the first projection having an outer rim surface continuing from an outer rim surface of the first segment when secured, the outer rim surface of the first projection comprising a plurality of holes;
    a second projection extending toward a second temporal end of the second rim circumferentially from, and integral with said third segment, the second projection having an outer rim surface continuing from an outer rim surface of the third segment when secured, the outer rim surface of the second projection comprising a plurality of holes;
    wherein said first projection and said second segment are configured to be releasably secured to one another, thereby securing the at least one first lens within the first rim near a first temporal end of the frame, and
    wherein said second projection and said fourth segment are configured to be releasably secured to one another, thereby securing the at least one second lens within the second rim near a second temporal end of the frame,
    a nose-pad body comprising first and second pads, the nose-pad body configured to be secured to a bridge of said frame by a nose-pad securing member comprising a top wall and a bottom wall,
    wherein the nose-pad body is secured about a bridge of the frame at a top surface of the bridge of the frame and a bottom surface of the bridge of the frame with attachment of: (a) the top wall of the nose-pad securing member at the top surface of the bridge of the frame and (b) the bottom wall of the nose-pad securing member at the bottom surface of the bridge of the frame,
wherein the frame provides impact resistance against a sport projectile.

13. The impact resistant frame assembly of claim 12, wherein said first segment includes a first groove along an inner surface into which groove said first lens is insertable and said second segment includes a groove in which said first projection is secured.

14. The impact resistant frame assembly of claim 13, wherein the first segment includes a second groove generally parallel to the first groove along the inner surface into which second groove, a third lens is insertable.

15. The impact resistant frame assembly according to claim 13, wherein said first projection extends along an outer surface of the first segment.

16. The impact resistant frame assembly of claim 12, wherein said frame further comprises a receiving surface for receiving a temple arm securable to said frame, and wherein the first segment and second segment releasably secure at a split on the first rim beneath the receiving surface.

17. The impact resistant frame assembly according to claim 12, wherein said frame is made of a material selected from a group consisting of synthetic polymers and polyamides.

18. The impact resistant frame assembly according to claim 12, wherein the nose-pad securing member comprises a C-profile and is connected to the nose-pad body by a through-recess of the nose-pad body.

19. The impact resistant frame assembly according to claim 18, wherein the bridge comprises a hole for securing the nose-pad securing member to the bridge.

20. The impact resistant frame assembly according to claim 12, wherein the nose-pad body is adhered to the frame.

\* \* \* \* \*